United States Patent [19]

Pennebaker et al.

[11] Patent Number: 4,965,677
[45] Date of Patent: Oct. 23, 1990

[54] COMPRESSION OF BINARY HALFTONES

[75] Inventors: William B. Pennebaker, Carmel; Karen L. Anderson, Mohegan Lake; Joan L. V. Mitchell, Ossining, all of N.Y.

[73] Assignee: International Business Machines Corporation, Armonk, N.Y.

[21] Appl. No.: 305,313

[22] Filed: Feb. 1, 1989

[51] Int. Cl.$^5$ .............................................. H04H 1/41
[52] U.S. Cl. .................................. 358/429; 358/261.1; 358/261.3
[58] Field of Search ................... 358/260, 261.1, 261.3, 358/280, 283, 429, 457

[56] References Cited

U.S. PATENT DOCUMENTS

| | | | |
|---|---|---|---|
| 4,091,424 | 5/1978 | Widergrem | 358/261 |
| 4,213,154 | 7/1980 | Ono et al. | 358/260 |
| 4,400,738 | 8/1983 | Tomory et al. | 358/283 |
| 4,602,383 | 7/1986 | Ogawa et al. | 382/56 |
| 4,630,125 | 12/1986 | Roetling | 358/280 |
| 4,809,091 | 2/1989 | Limeham | 358/261.3 |

OTHER PUBLICATIONS

IBM Technical Disclosure Bulletin, vol. 24, No. 5, Oct. 1981, "Uncompressed Mode Trigger", by R. W. Alexander, and J. L. Mitchell, pp. 2476-2480.
IBM Technical Disc. Bull., vol. 26, No. 10, Mar. 84, "Digital Halftoning Using Biased Error Diffusion", by D. Anastassiou, pp. 5723-5727.

*Primary Examiner*—Edward L. Coles, Sr.
*Attorney, Agent, or Firm*—Thomas P. Dowd

[57] ABSTRACT

A system is described for reformatting halftone data for compression, wherein an original bilevel image is reformatted to produce another bilevel image that allows vertical correlations to be recognized by the compression technique, thus improving compressibility dramatically, with particular suitability for facsimile transmissions. In reformatting it is assumed that a selected halftone frequency H will satisfactorily describe an entire document, and each of successive sets of H consecutive lines are concatenated to form respective single lines. The thus reformatted lines have a clearer halftone periodicity offering greater correlation and permit more efficient coding by well-known standard bilevel compression algorithms (e.g., CCITT G3 (MR) or GF4 (MMR)). For an image with unknown pattern frequency, a technique for readily estimating the frequency for use in reformating the image is described.

10 Claims, 3 Drawing Sheets 000011 001 11 0111 010 1 010 1 010 1 010 1 1
VR2  RL 2B 2W  VL1 V0 VL1 V0 VL1 V0 VL1 V0 V0

0001 1 1 1 1 1 1 1 1 1 1 1 1
PASS V0 V0 V0 V0 V0 V0 V0 V0 V0 V0 V0

COMPRESSION OF BINARY HALFTONES

BACKGROUND OF THE INVENTION

1. Field of the Invention

This invention relates to digital image processing methods and more particularly to methods for encoding and decoding image data involving pattern frequencies such as binary halftones.

2. Prior Art

The standard international data transmission CCITT Group 3 MR and Group 4 MMR two-dimensional data compression schemes contain Modified Huffman code tables which were optimized for compressing text and line drawings. However, binary halftone representations of continuous tone images have a very different distribution of run sizes and occurrence of vertical references from such drawings. As a result, the amount of data required to represent these halftone images in "compressed" form may be greater than the amount of data required to represent the original image when these compression schemes or other currently used compression techniques are used. This expansion can be limited to about 1.15 by using "uncompressed mode". However, by definition, this mode does not give any compression.

Some examples of prior systems for dealing with the compression of halftone image data are found in U.S. Pat. No. 4,144,547 to STOFFEL and U.S. Pat. No. 4,559,563 to JOINER, which describe processes for coding mixed (text and halftone) documents using multiple-predictor systems with sets of predefined predictors. STOFFEL teaches the use of each available predictor to predict each unit of input data whereby the best predictor is selected, its identity is encoded, and the unit of data is then encoded using that predictor. The decoder gets an indication from the compressed data stream as to which predictor is to be used to decode each unit of data. JOINER uses the predictor which would have performed best on the previous unit of data to predict the pel values for the current unit of data (so that the identity of the predictor to be used does not have to be transmitted). It will be seen that these teachings are general approaches to the problem of efficiently compressing halftones and are not simple extensions of, but rather would be substituted for, the well known standard bilevel compression algorithms (CCITT G3/G4).

U.S. Pat. No. 4,355,306 to MITCHELL also describes a generic bilevel image coder/decoder system. While this system performs well on halftones, it similarly would not operate as a simple extension of the standard bilevel compression algorithms or other commonly-used techniques.

Other examples are found in U.S. Pat. No. 4,571,634 to CANESCHI ET AL which describes a coder/decoder for bilevel and halftoned images in which the halftones are formed by having areas of strict alternation of black and white pels, thus restricting its applicability; U.S. Pat. No. 4,425,582 to KADAKIA ET AL and U.S. Pat. No. 4,435,726 to LIAO which disclose an efficient hardware implementation for a specific predictor that is designed to work well on both text and halftone data wherein the predictor and a corresponding de-predictor would be added to an encoder/decoder system, such as that defined by the CCITT G3/G4 standards, to produce a version of the original data altered by a predictor scheme; and U.S. Pat. No. 4,193,096 to STOFFEL which shows a system that scans and halftones an image and then compresses the resulting image based on knowledge of the halftoning process used, so that compression is dependent on the halftoning process generating the image data and thus this teaching is inapplicable in a system where all that is supplied to the coder is the bilevel image, and the coder has no control over the halftoning process.

Consequently, it is desirable, and an object of the present invention, to provide a simple and versatile technique that facilitates the efficient compression of binary halftone data representing continuous tone images by known and widely-used compression processes.

SUMMARY OF THE INVENTION

The system and method of the present invention is directed to taking a binary halftoned image with a given halftone pattern frequency and reformatting it to obtain image data which compresses better than the original image data using the CCITT standard Group 3 or Group 4 two-dimensional compression techniques or other currently popular data compression processes. Accordingly, each H lines of the original image are concatenated into the form of a single image line for purposes of compression, where H is the halftone pattern frequency. The resulting reformatted image data may then be compressed using one of the CCITT algorithms, or with any other algorithm which makes use of correlations between features on a current line and those on the immediately preceding line, in an efficient manner.

A further feature of the present invention is the determining, for an image with unknown pattern frequency, of a good estimate of the frequency for use in reformatting the image.

DETAILED DESCRIPTION OF A PREFERRED EMBODIMENT OF THE INVENTION

Figure 1:
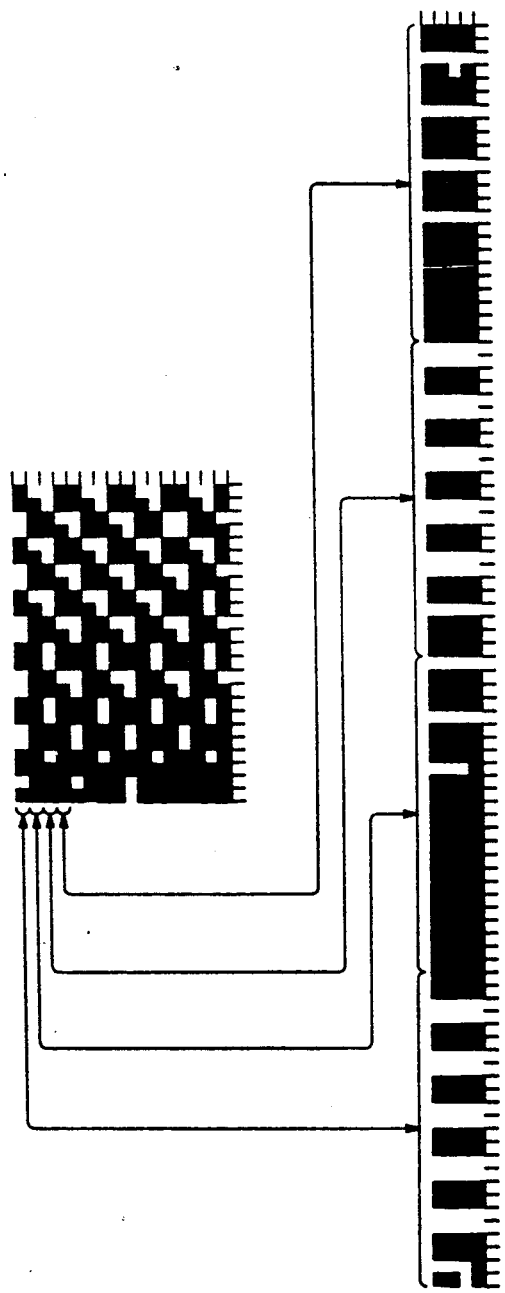
FIG. 1 shows a small piece of a typical halftoned image with a pattern frequency of four, in both original and reformatted form.

The reformatting of a halftoned image in accordance with the present invention is illustrated in FIG. 1. The upper image shows a small piece of a typical halftoned image. Each square is one pel (picture element). The small lines below and to the right of the image data indicate the demarcation between the pel rows and columns. The halftone pattern is formed in a 4×4 pel block. The reformatted image is shown below with lines 1, 2, 3, and 4 having been concatenated to form the first line; lines 5, 6, 7, and 8 to form the second line; and successive groups of four lines forming the subsequent lines. It will be seen that the reformatted image shows much greater vertical correlation of edges from one line to the next. Facsimile compression algorithms such as the CCITT Group 3 two-dimensional and Group 4 algorithms assume that such correlation is typical of bilevel images, and have relatively short code words to describe the existence of such correlation. Thus, if these compression algorithms are applied to an image which shows greater correlation, better compression will result. For example, the upper original image shown in FIG. 1 requires 88 bytes to code using the CCITT Group 4 algorithm, while the lower reformatted image requires only 46 bytes to store the same information. Reformatting a halftoned image as described allows each feature to be coded in a context of features from the same position in the halftone pattern above it. This is of significant value when many common forms of halftoning such as supercircle or dither have been used to create the image to be compressed; it is of lesser value with halftoning techniques such as error diffusion which do not create any regular pattern.

Figure 2A:
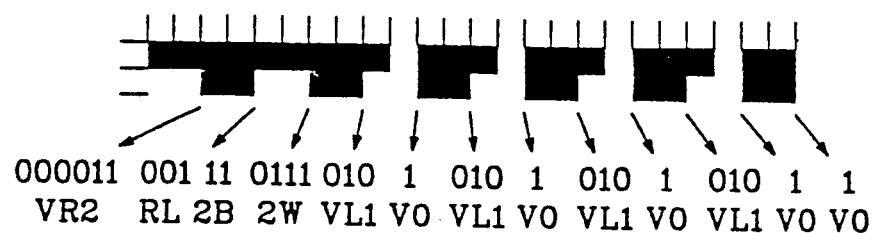
FIG. 2 contrasts the coding of a line of the original image fragment using the reference data from the (a) original and (b) reformatted images.
Figure 2B:
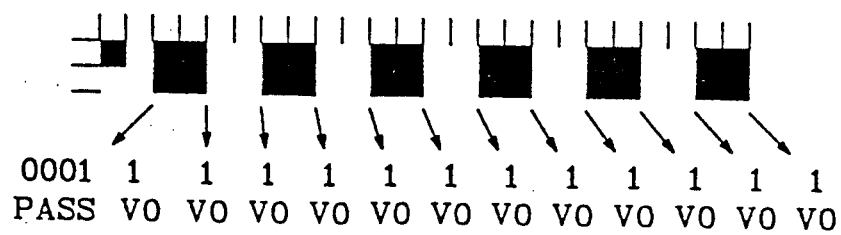

FIG. 2 illustrates the advantage to be gained in coding reformatted halftone data as compared to unreformatted data. Both portions, (a) and (b), of the figure show coding of line 9 of the original unreformatted image of FIG. 1. Line 9 forms the second line in each illustration in FIG. 2, while the first line shows the reference data used for coding. In FIG. 2a, the reference line is line 8 of the original image, which would be used as the reference data in coding the unreformatted image. In the reformatted image, the reference data will be from the line in the original image located four lines back from the line being coded, i.e. line 5, as shown in FIG. 2b. It will be understood that in FIG. 2b all of the reformatted image lines are not shown, only the parts which correspond to the data in FIG. 2a.

Below each image fragment in FIG. 2 the CCITT G4 bit patterns which encode the image data are shown, along with a shorthand interpretation of the meanings of the codes. In G4 each black/white or white/black transition causes one or (occasionally) more coding operations. In FIG. 2a, the first white run end coded lies two pels to the right of the reference run end (the left edge of the image in this case). This is indicated by a six-bit "vertical right two" code. The next two transitions define a white run which does not correspond to any run on the upper reference or history line, so a "run-length" prefix is used and the two runs (a two-pel black run and a two-pel white run) are coded using the one-dimensional codes. Following this, there is a black run which ends one pel to the left of the corresponding run on the reference line, so a three-bit "vertical left one" code is used. The next white run lines up exactly with the reference data, producing a one-bit "vertical zero" code. This pattern (VL1,V0) is repeated three more times for the next halftone pattern blocks. The final black run is aligned with the reference black run on the right edge of the image, so another "vertical zero" code is produced. Thus, the 24-bit image line has been "compressed" to 32 bits.

In contrast, the same line can be coded in 16 bits by using the reference data provided by the reformatted image, as shown in FIG. 2b. The first black run on the reference line does not correspond to anything on the line being coded, so a "pass" code is generated. After that all of the run ends are exactly aligned with the reference run ends, so a one-bit "vertical zero" is coded for each run end. In this case the reformatting has made the difference between expansion and modest compression of the halftoned data. In halftoned areas which are very light or very dark, the compression may be greater because not all lines have runs of both black and white in every halftone block, so that somewhat longer runs occur in the reformatted image.

In general then, for a halftoned image consisting of R rows and C columns and having a known pattern frequency H, compression can often be improved by reformatting the image to create an image having R/H rows and CxH columns, in which the first H rows of the original image are concatenated in sequence to form the first row of the reformatted image, the next H rows of the original image are concatenated to form the second row of the reformatted image, and successive groups of H rows accordingly form the subsequent rows.

In practice, reformatting of an image may be done in various ways, but a simple technique to achieve it implicitly is by specifying an altered set of parameters to the encoder. For example, in an encoding system such as that described in U.S. Pat. No. 4,725,815 issued Feb. 16, 1988 to MITCHELL, ANDERSON, and GOERTZEL, entitled "Method for Encoding and Decoding a Digital Image", wherein the coder is embodied in a computer program, one of the values which is input into the program is the number of pels per image line. If the lines of the image to be coded are arranged sequentially in storage for input into the program, the true number of pels per image line can be replaced with the product of the number of pels per image line and the halftone pattern frequency, thus in effect producing the desired image reformatting. More particularly, if there are 1000 pels per line and the pattern frequency is 4, the number of pels per line could be presented to the encoder as 4000. Under these circumstances, the decoder would have to decode the image assuming the same number of pels per line which was supplied to the encoder. It would then reformat the resulting image, which is a trivial operation when the decoded image lines are arranged sequentially in storage.

In many instances the halftone pattern frequency of a given image will be known, since the image will have been halftoned by a known system or process that produces halftone patterns of a particular frequency. However, this is not always the case. If the pattern frequency is unknown, it becomes desirable to be able to quickly determine a workable value in a simple manner such as by selecting an estimated value based on an examination of the image. Conceptually, one way to do this is to compare each line with each of the previous L history lines, where L is some appropriate maximum pattern frequency value. For example, it might be assumed that the pattern frequency will be no more than 8, i.e., L=8. After doing the comparisons with the preceding 8 lines for one selected image line, the history line which produced the best match is chosen and its position (e.g. "4th line back") is used as an estimate E of the halftone frequency for that line. By processing each line in the image in this way, a set of estimated frequencies E can be developed. The one which occurs most often would be selected as the frequency to be used for reformatting. It will be seen that if an image processed in this way is actually a "true bilevel" image (e.g., text or line art), the best correlation will normally be with the immediately preceding line, and so a "pattern frequency" of 1 will result and the image will be coded in its original format.

A detailed description of a preferred embodiment for carrying out an estimating procedure in accordance with the invention, particularly in the form of a program to run on a general purpose computer, such as an IBM System/370, will now be set forth with reference to FIG. 3.

Figure 3:
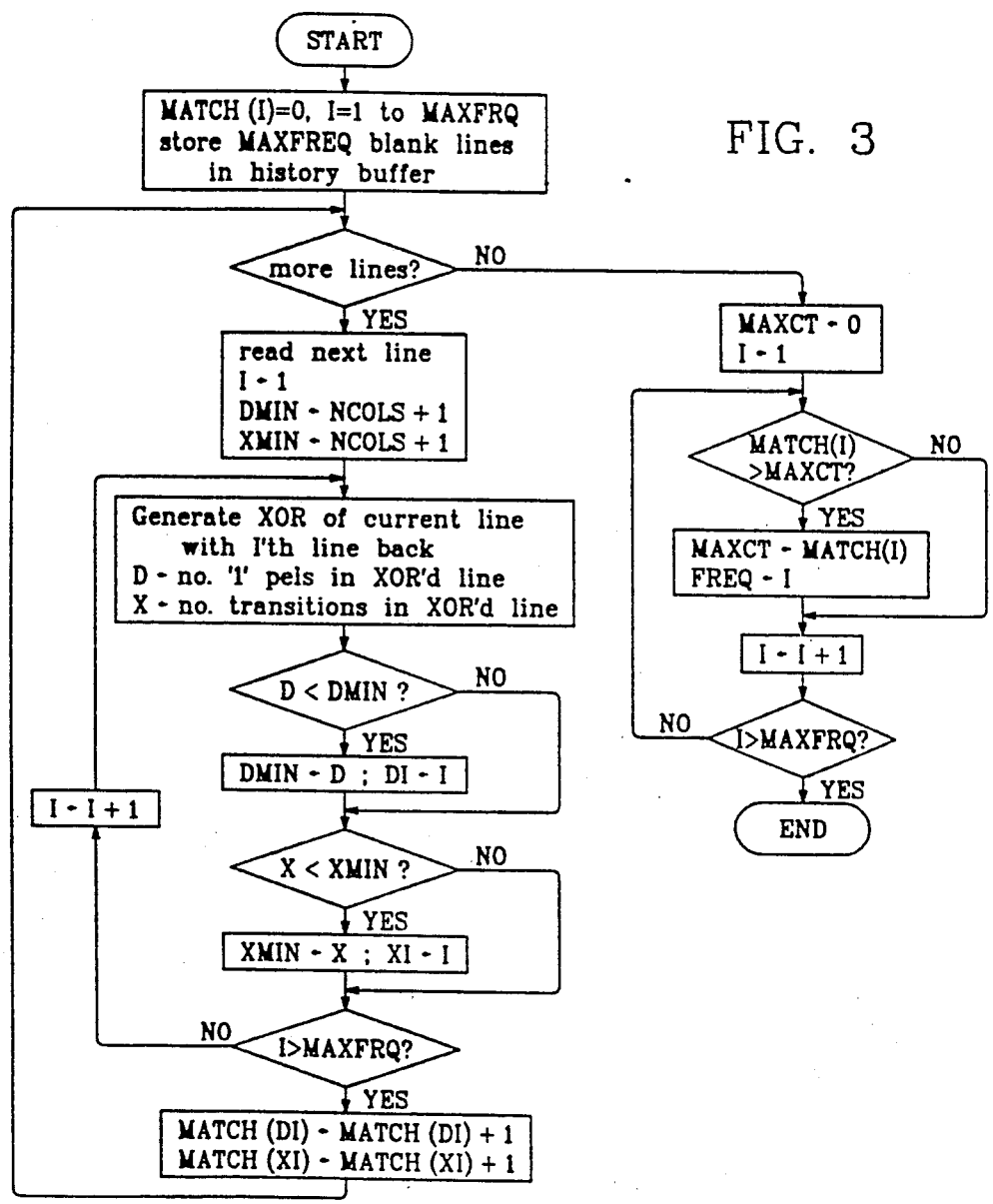
FIG. 3 shows a method for estimating the halftone pattern frequency of an image.

The flowchart of FIG. 3 shows a method for estimating the halftone pattern frequency of a typical image to be reformatted in accordance with the present invention. The maximum frequency, MAXFRQ, to be used in the search for the estimated reformatting frequency, FREQ, is initially selected or estimated based on programming, hardware, or execution speed considerations. For a given or current line, the preceding lines are examined as far back as the preset distance L, mentioned above (L= MAXFRQ), to find the best match. Of course, the more lines that are examined, the more time it will take to do the comparisons, and the more storage that will have to be used to keep all of the required previous lines available. Consequently, it is desirable not to do a comparison with every line going back to the beginning of the image. It accordingly should be determined how far back it is worthwhile to look for a match, based on the above-noted considerations for the system in which the invention is being applied, in particular, e.g., what size halftone patterns are likely to appear and how much processing effort is to be expended to find the pattern value. Clearly, if a large MAXFRQ is chosen and the pattern frequency is small, considerable time is wasted comparing lines that are too far back to be of interest. In attempting to circumvent this problem one might design a system in which successive lines beginning with the preceding line and moving backward through the image are examined in turn, with the comparison stopping as soon as a line which is not a better match than the previously examined line is found. With this approach, however, the system may get caught in a local minimum and "give up" before finding a much better match a little farther back. Of course, one circumstance in which the search might be aborted before all lines have been compared is when an exact match for the current line is found. Otherwise, it is certainly desirable to examine all lines which are reasonable candidates for a match. MAXFRQ is thus selected to be the minimum distance estimated to be needed to look back to pick up a reliable pattern frequency. For most images of the type contemplated, i.e., about 240 pel/inch, the pattern frequency is usually rather small, e.g., 4 or 6; but for a 600 pel/inch scanned halftone it may be about 11 or 12.

Once the MAXFRQ has been selected, the vector MATCH keeps track of how many times each frequency from 1 to MAXFRQ appears to be the best estimate of the pattern frequency for an image line, based on two different criteria: 1) the number of pels which differ between the line being examined and a reference or history line; and 2) the number of white/black and black/white transitions on the line formed by exclusive-ORing the line being examined and a history line. Two criteria are used instead of one because neither is a perfect estimator of the similarity between lines. By way of explanation, generally, if two history lines produce about the same number of runs on the exclusive-OR'd line, the line having fewer pels different is the better match for the line being examined; but, the number of pels which differ does not always indicate better correlation. For example, two lines which are identical except for one very long run added to one will have many pels which differ, but only two run ends in the exclusive-OR'd line, and only a relatively small amount of additional data will be required to code one with reference to the other. Similarly, a line on which several edges shift by a single pel will have very few pels different from a reference line, but many added transitions on the exclusive-OR'd line, and a large amount of additional data will be coded.

The large loop on the left side of the chart estimates the pattern frequency E for each line in sequence. MATCH is zeroed initially. MAXFRQ blank lines are stored in a history buffer, so that there will be enough history lines to compare to the initial image lines. At the beginning of the loop, if another input line remains, it is read in. An index I is initialized to 1, and the minimum different pel count DMIN and the minimum transition count XMIN are initialized to the number of pels per line NCOLS plus one, so that comparison with at least one line must find fewer pels different and fewer transitions. A loop is then entered which compares the current line to the I'th line back, where I runs from 1 to MAXFRQ. For each of the I history lines, the exclusive-OR of the current line and the history line is formed. The number D of 1-valued pels in the exclusive-OR'd line gives the number of pels which differ between the two lines; and if this value is less than DMIN, it replaces DMIN, and the current value of I is saved as DI. The number X of transitions in the exclusive-OR'd line is compared to XMIN; and if the new value is smaller, it replaces XMIN, and the value of I is saved as XI. It should be noted that if D=DMIN or X=XMIN, the minimum value is not updated; this resolves "ties" in favor of the line closer to the current line. When the smaller loop is exited, DI and XI contain estimates E of the pattern frequency for the current line based on the two difference criteria. The counters MATCH(DI) and MATCH(XI) are incremented to record "votes" for those frequencies, and the loop repeats to process the next line.

After all of the image lines have been processed in this manner, MATCH is examined to determine which frequency, among the Es, was most often chosen as the likely pattern frequency. The maximum number of times a value has been chosen, MAXCT, is initialized to zero, and a loop is entered which finds the maximum value of MATCH(I) where I runs from 1 to MAXFRQ. This value is saved as MAXCT, and the value of I which corresponds to it is saved as FREQ. On exit from this loop, FREQ gives the estimate of the halftone pattern frequency, that is, the number of lines H which will be concatenated in accordance with the present invention.

It will be appreciated that variations on this general scheme are possible within the scope of the invention. One of the criteria for deciding which history line matches the current line best might be omitted, or some alternative criteria may be added or substituted. Different criteria could be given different weights in the decision-making process. For example, if the value of D in the first loop is considered to give a more accurate indication of the quality of the match than X, then MATCH(DI) could be incremented by a greater value than MATCH(XI); the DI values would then dominate the decision made in the final loop. The invention might be extended to graylevel or color images in situations where a pattern frequency may exist (e.g. for a scanned halftone), and it might also be applied to portions of an image, allowing some switching between pattern frequencies when part of an image consists of halftone data and part consists of more conventional facsimile material (text and line art).

It will accordingly be seen that a system and method have been disclosed for obtaining good compression of halftone images created with a known halftone pattern frequency. An original bilevel image is reformatted to produce another bilevel image that allows vertical correlations to be recognized by the compression technique, thus improving compressibility dramatically, with particular suitability for facsimile transmissions. The reformatting is carried out by concatenating each successive group of H lines together (where H is the halftone pattern frequency), and using the CCITT Group 3 two-dimensional (MR) algorithm, the CCITT Group 4 algorithm (MMR), IBM MMR, or any similar two-dimensional coding procedure to encode the reformatted image. Further, the halftone pattern frequency of an image of unknown characteristics can readily be estimated by examination of the image in the manner described.

We claim:

1. A method of compressing an image, consisting of a plurality of lines of picture elements with intensities that vary with respect to each other forming patterns having a periodicity of H lines, comprising the steps of:

reformatting said image by concatenating the first H lines in sequence to form a single line, p1 concatenating th next H lines in sequence to form a second line, and repeating this process of concatenating the next H lines in sequence until the entire image has been so reformatted; and applying a compression algorithm which makes use of directional correlations to compress said reformatted image.

2. A system for compressing an image, consisting of a plurality of lines of picture elements with intensities that vary with respect to each other forming pattern having a periodicity of H lines, comprising:

means for reformatting said image by concatenating the first H liens in sequence to form a single line, concatenating the next H lines in sequence to form a second line, and repeating the concatenating of successive sets of H lines in this manner until the entire image has been so reformatted; and means for applying a compression algorithm which makes use of directional correlations to compress said reformatted image.

3. A system for determining the pattern frequency H of an original image, consisting of a plurality of lines of picture elements with intensity values that vary with respect to each other forming patterns having a periodicity, comprising:

means for selecting a maximum pattern frequency MAXFREQ to be used in searching for said pattern frequency H;

means for comparing a given line of said image with each of MAXFREQ preceding lines of said image;

means for determining which preceding line of said MAXFREQ preceding lines most closely matches said given line;

means for selecting an estimated patter frequency by selecting the number E of lines before said given line at which the most closely match occurs to be the estimated pattern frequency;

means for repeatedly actuating said comparing, determining, and selecting means with successive image lines being the given line to compute a plurality of E values for said image; and means for selecting the most frequently occurring E value as the pattern frequency H of the image.

4. A system as in claim 3 wherein said image is a bilevel image and said comparing means comprises:

means for exclusive-ORing the picture element values in a given line of said original image with the respective picture element values in each of MAXFREQ preceding lines of said image to produce respective resultant lines;

and said determining means comprises:

means for counting the number of 1-value and 0-value runs in each resultant line; and means for noting the number of lines E before said given line at which the number of runs, counted by said counting means, first reaches a minimum value.

5. A system as in claim 3 wherein said image is a bilevel image and said comparing means comprises:

means for exclusive-ORing the picture element values in a given line of said original image with the respective picture element values in each of MAXFREQ preceding lines of said image to produce respective resultant lines;

and said determining means comprises:

means for counting the number of 1-valued picture elements in each resultant line; and means for noting the number of lines E before said given line at which the number of 1-valued picture elements, counted by said counting means, first reaches a minimum value.

6. A method for determining the pattern frequency H of an original image, consisting of a plurality of lines of picture elements with intensity values that vary with respect to each other forming patterns having a periodicity, comprising the steps of:

selecting a maximum pattern frequency MAXFREQ to be used in searching for said pattern frequency H;

comparing a given line of said image with each of MAXFREQ preceding lines of said image;

determining which preceding line of said MAXFREQ preceding lines most closely matches said given line;

selecting an estimated halftone pattern frequency by selecting the number E of lines before said given line at which the most closely match occurs to be the estimated pattern frequency;

repeating said comparing, determining, and selecting steps with successive image lines being the given line to compute a plurality of E values for said image; and selecting the most frequently occurring E value as the pattern frequency H of the image.

7. A method as in claim 6 wherein said image is a bilevel image and said comparing step comprises:

exclusive-ORing the picture element values in a given line of said original image with the respective picture element values in each of MAXFREQ preceding lines of said image to produce respective resultant lines;

and said determining step comprises:

counting the number of 1-value and 0-value runs in each resultant line; and noting the number of lines E before said given line at which the number of runs, counted in said counting step, first reaches a minimum value.

8. A method as in claim 6 wherein said image is a bilevel image and said comparing step comprises:

means for exclusive-ORing the picture element values in a given line of said original image with the respective picture element values in each of MAXFREQ preceding lines of said image to produce respective resultant lines;

and said determining step comprises:

counting the number of 1-valued picture elements in each resultant line; and noting the number of lines E before said given line at which the number of 1-valued picture elements, counted in said counting step, first reaches a minimum value.

9. A system for reformatting halftone data wherein an original bilevel image, having its pel values represented by successive lines of binary data, is reformatted to get another bilevel image which allows vertical correlations to be recognized comprising:

means for exclusive-ORing the pel values in a given line of said original image with the respective pel values in each of a selected number of preceding lines of said image to produce respective resultant lines;

means for counting the number of 1-value and 0-value runs in each resultant line;

means for counting the number of 1-valued pels in each resultant line;

means for determining the respective number of lines E preceding said given line at which the count of runs and the count of 1-valued pels first reach minimum values;

means for storing said E values as estimated halftone pattern frequencies;

means for repeatedly actuating each of the preceding means with successive lines being the given line to compute a plurality of E values;

means for selecting the most frequently occurring E value as the halftone pattern frequency H of the image; and means for reformatting said image by concatenating the first H lines in sequence to form a single line, concatenating the next H lines in sequence to form a second line, and repeating the concatenating in this manner until the entire image has been so reformatted.

10. A method for reformatting halftone data wherein an original bilevel image, having its pel values represented by successive lines of binary data, is reformatted to get another bilevel image which allows vertical correlations to be recognized comprising the steps of:

exclusive-ORing the pel values in a given line of said original image with the respective pel values in each of a selected number of preceding lines of said image to produce respective resultant lines;

counting the number of 1-value and 0-value runs in each resultant line;

counting the number of 1-valued pels in each resultant line; determining the respective number of lines E preceding said given line at which the count of runs and the count of 1-valued pels first reach minimum values;

storing said E values as estimated halftone pattern frequencies;

repeating each of the preceding steps with successive lines being the given line to compute a plurality of E values;

selecting the most frequently occurring E value as the halftone pattern frequency H of the image; and reformatting said image by concatenating the first H lines in sequence to form a single line, concatenating the next H lines in sequence to form a second line, and repeating the concatenating in this manner until the entire image has been so reformatted.

* * * * *

UNITED STATES PATENT AND TRADEMARK OFFICE
CERTIFICATE OF CORRECTION

PATENT NO. : 4,965,677

DATED : October 23, 1990

INVENTOR(S) : W.B. Pennebaker, K.L. Anderson, J.L. Mitchell, K. Toyokawa

It is certified that error appears in the above-identified patent and that said Letters Patent is hereby corrected as shown below:

ON TITLE PAGE:

[75] Inventors: William B. Pennebaker, Carmel;
Karen L. Anderson, Mohegan Lake;
Joan L.V. Mitchell, Ossining, all of New York;
Kazuharu Toyokawa, Kanagawa-ken, Yamoto-shi, Japan Signed and Sealed this Twenty-fifth Day of February, 1992

Attest:

HARRY F. MANBECK, JR.

*Attesting Officer*     *Commissioner of Patents and Trademarks*